United States Patent
von Haas

(10) Patent No.: US 6,599,456 B1
(45) Date of Patent: Jul. 29, 2003

(54) METHOD AND APPARATUS FOR THE CONTINUOUS AND DISCONTINUOUS PRODUCTION OF BOARDS OF LIGNEOUS MATERIAL

(75) Inventor: Gernot von Haas, Im Schlessgartem (DE)

(73) Assignee: Maschinenfabrik J. Dieffenbacher GmbH & Co, Eppingen (DE)

( * ) Notice: Subject to any disclaimer, the term of this patent is extended or adjusted under 35 U.S.C. 154(b) by 109 days.

(21) Appl. No.: 09/689,706
(22) Filed: Oct. 13, 2000

(30) Foreign Application Priority Data

Oct. 14, 1999 (DE) .......................... 199 49 662

(51) Int. Cl.$^7$ .............................. B29C 43/22
(52) U.S. Cl. .................. 264/120; 264/109; 425/371
(58) Field of Search ............. 425/371; 264/109, 264/120

(56) References Cited

U.S. PATENT DOCUMENTS 4,004,870 A * 1/1977 Guttinger et al. ........... 264/216
6,176,951 B1 * 1/2001 Bielfeldt et al. ......... 156/272.2

FOREIGN PATENT DOCUMENTS

DE  24 14 762   10/1975
DE  197 50 847  11/1997

* cited by examiner

Primary Examiner—Mary Lynn Theisen
(74) Attorney, Agent, or Firm—Foley & Lardner

(57) ABSTRACT

An apparatus and a method for the production of boards of ligneous material in which a mat is formed of pressed material treated with a binding agent. The mat moves continuously away from a spreading station and after introduction between the steel bands of a continuously operating hot press is cured to form a board strand by the application of pressure and heat. Immediately after leaving the hot press the hot board strand is exposed to a cooling apparatus. In this invention the two surfaces of the hot board strand are abruptly quenched and moistened with a water spray in a first cooling section which contains an evaporation zone and which is variable in length and adaptable to the thickness of the strand. The board strand is held under the pressure of multiple calendar rolls, and in a directly adjoining second cooling section, it is guided with light specific pressure through a double-belt hold-down apparatus in which the backs of the hold-down belts are sprayed with an appropriate coolant as it passes.

16 Claims, 2 Drawing Sheets

METHOD AND APPARATUS FOR THE CONTINUOUS AND DISCONTINUOUS PRODUCTION OF BOARDS OF LIGNEOUS MATERIAL

BACKGROUND OF THE INVENTION

1. Field of Invention

The invention relates to a method for the continuous production of boards of ligneous material, and an apparatus for the practice of the process.

2. Description of the Related Art

Ligneous materials comprising fibers, chips or strands can be manufactured quite effectively into boards with the use of organic binding agents. Organically bound adhesives (urea, melamine and phenol formaldehyde) and isocyanates are used predominantly, as well as mixtures of these binding agents. Boards which are bonded with urea resin and with modified urea resin are cooled after hot pressing. The cooling has proven necessary, since after curing in the hot press, the urea resin hydrolyzes by the action of temperature and moisture ("hydrolysis effect"). The hydrolysis of the binding agent leads to weakening of the adhesive bond and thus to an impairment of the practical properties of the ligneous material boards. Thus, the mechanical properties, such as resistance to flexure and transverse strength are impaired and swelling of the board is increased.

Cooling is performed in various ways. As a rule, the boards are transported after hot pressing to a cooling star turner [Kühlsternwender]. Transport from the end of the press to the cooling star turner takes approximately two minutes. The boards are fanned out in the turner. Air has free access to the boards on all sides. With warming of the air, the boards are slowly cooled. Usually several turners are used to cool the boards, which pass through one after the other. After about 20 minutes, the temperature at the center of the board has dropped to about 70° C. The thickness of the board is reduced during cooling by up to 0.2 mm, a large part of the thickness reduction being caused by the drying out of the boards (post-shrinkage). Since transport to the first cooling star turner takes about two minutes and the boards cool slowly, the adhesive bonds formed in the hot press are partially destroyed. This weakening of the adhesive bond happens mainly with adhesives that are sensitive to hydrolysis.

The moisture distribution over the board's cross section becomes varied during the hot pressing and cooling. During the hot pressing, moisture is vaporized out of the outer layer and carried to the middle of the board where part of the vapor condenses. Some of the vapor travels from the middle of the board to the edges of the board and passes into the atmosphere, so that the average moisture decreases by one to three percent during the hot pressing. Immediately after the hot press, it is mainly the surface layers that dry out, so that the average moisture content of the board is further reduced. After cooling, the moisture in the surface layers is about 2% and in the middle layer about 6–8%. The boards are then stacked in the warehouse. In the curing warehouse, the board cools down further and an equalization of moisture takes place within the board. In addition, the board absorbs moisture from its environment. Often some boards become warped in storage due to uneven climatic conditions in the stack. Considerable capital is tied up in such a warehouse, and this entails expense. Even after three weeks of storage, the moisture is not uniformly distributed throughout the board's cross section. Further, the average moisture content of the board is below the equalization moisture of 8% in countries of moderate climate and 12% in countries of humid climate.

Various other proposals have been made for cooling the boards. An attempt has been made to cool the boards in cooling channels with forced ventilation. The use of cooling, channels proved to be disadvantageous since the climatic conditions were controllable to only a limited degree. This resulted in irregular temperature distributions being created in the boards. It has also been proposed to cool the boards in conditioning chambers (Kioseff Holzindustrie 1974). In this case, the boards were set up vertically and passed through a chamber in the first part of which the boards are cooled with air with a natural rising air current. In the second part, forced air currents are passed around the boards. Even in this conditioning chamber, the air velocity was not uniform, so that temperature differences occurred in the board upon cooling, resulting in warping in the boards. The cooling time could not be appreciably shortened in comparison to the star turners.

Cyclic presses have also been used for the cooling and for later equalization of boards. Such cyclic presses have been set up at some distance from the hot press in plants with single and multiple stage hot presses. The cyclic cooling in single or multiple stage presses entailed a few disadvantages. There were problems in the material flow. Cyclic cooling presses must be designed so that their capacity is sufficient to cool the entire production of the hot press. The handling of the boards is complicated. Also, considerable problems are involved in the cyclic feeding of the press. The board surfaces cool at different rates, so that warping occurs.

Also, German Patent 197 50 847 has disclosed a method for cooling hot-pressed boards in which the board surface is cooled intensively in a first step within a first period t1 to about 100° C., and in a second step the board surface is cooled with air within a second period t2 to below 60° C. A disadvantage of this process, it is to be noted, is that moistening of the board surfaces causes the fibers and chips in the surface layers to be moistened and swell up, resulting in rough areas on the board surfaces. An additional repair operation is necessary.

German Patent 24 14 762, from which the invention sets out, discloses an apparatus which includes a continuously operating press, a sliding cooling plate system using a low specific pressure application and a gauging apparatus. The established purpose of this patent, however, is the gauging of the board strand after it leaves the continuously operating press. A sufficient rapid cooling of the board strand immediately after it leaves the continuously operating hot press thus is not possible, which means that the above-stated disadvantages in leaving the continuously operating hot press are likewise unavoidable.

SUMMARY OF THE INVENTION

The present invention provides a method for the production of boards of ligneous material comprising: forming a press material mat treated with a binding agent on a continuously moving spreading band, introducing the mat between the steel bands of a continuously operating hot press, applying pressure and heat to the mat in the continuously operating hot press, curing the mat into a board strand in the continuously operating hot press, moistening both surfaces of the hot board strand, shock cooling the hot board strand with sprayed water in a first cooling section with an evaporation zone variable in its length and adaptable to the thickness of the board strand wherein the board strand is held between endless blocking bands under multiple calendar rolls and carrying the board bands to a directly adjoining second cooling section under a predetermined light pressure through a double-band hold-down apparatus wherein the backs of the hold-down bands are sprayed with a coolant.

The present invention also provides apparatus for the production of ligneous material boards comprising: a continuously operating hot press including two flexible endless steel bands, a press table, a press ram, a first water spray cooling apparatus of variously adjustable length with water spray nozzles adapted to directly spray water onto the surfaces of the boards and calendar rolls to put the board under light pressure and a cooling apparatus, wherein the second cooling apparatus is a second double-band hold-down apparatus which can travel in a cooling range of the first water spray cooling apparatus and having a plurality of rows of coolant spray nozzles disposed on the backs of the band surfaces of the double-band hold-down apparatus which provide contact on the boards.

BRIEF DESCRIPTION OF THE DRAWINGS

Additional advantageous measures and embodiments of the subject matter of the invention will appear in the subordinate claims and the following description with the drawings.

DETAILED DESCRIPTION OF THE PREFERRED EMBODIMENTS

Figure 1:
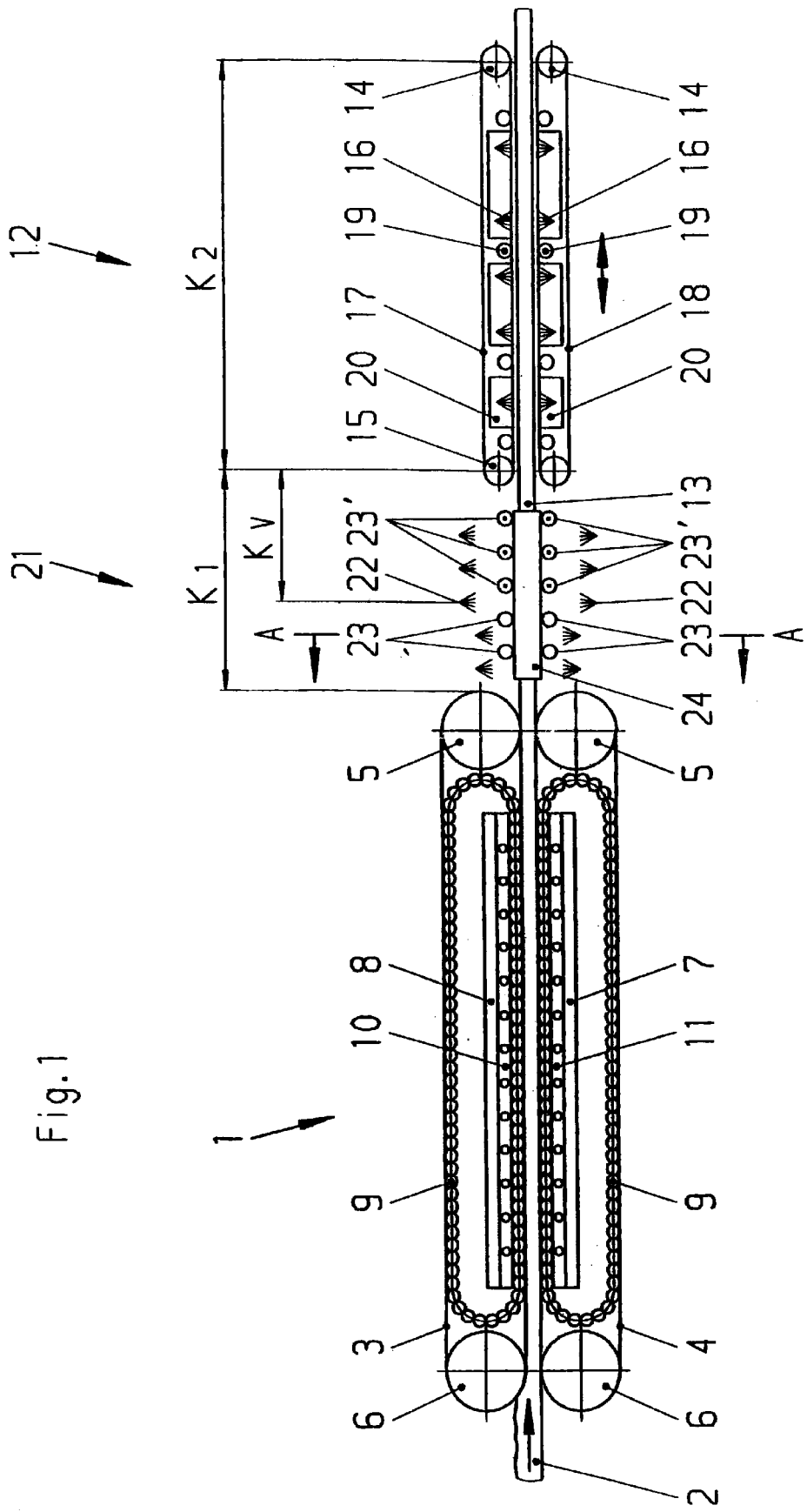
FIG. 1 Is a schematic side view of an embodiment of the invention.

The invention addresses the problem of devising a method by which a process of cooling boards can be performed in the course of the manufacture of ligneous material boards or boards of synthetic material such that the "hydrolysis effect" no longer occurs, warping of the boards is prevented, the disadvantages mentioned above are not encountered, and air conditioning can be largely dispensed with. In one preferred embodiment, the ligneous material used in the process is selected from chips, fibers, chip boards, fiber boards, and a combined portion of wood and plastic. In another preferred embodiment, the boards used in the process are selected from plastic boards and plastic boards from a combined portion of wood and plastic, and from plastic with and without reinforcing inserts.

The solution of this problem according to a preferred method of the invention, involves both faces of the hot board strand being abruptly chilled and moistened with sprayed water in a first cooling section having an evaporation zone. The evaporation zone is variable in length and adaptable to the thickness of the strand. The faces are held under pressure in between multiple calendar rolls. In a second cooling section directly adjoining the first cooling section, the board strand is guided under a predetermined light pressure through a double band hold-down device, while the backs of the hold-down bands are sprayed with an appropriate coolant as they pass through.

The apparatus according to a preferred embodiment of the invention includes a first water spray cooling system of variably adjustable length disposed immediately after the continuously operating hot press. The water spray cooling system directly sprays water through water spray nozzles onto the surfaces of the board strand while the board strand is under light pressure from calendar rolls. A second cooling system is provided in the form of a double-band hold-down system. Again, the board strand is under a light specific pressure. The second cooling system can travel in a cooling area of the first water spray cooling system and includes a plurality of rows of coolant spray nozzles disposed on the backs of the hold-down bands making contact with the board strand.

An important advantage of the present method is, in addition to the quick surface cooling, the raising of the average board moisture content and the production of a uniform moisture profile. This has at least two advantages. First, the board is sprayed under light calendar roll pressure in order to moisten. Second, the raising of the fibers or chips from the board surfaces due to swelling, along with permanent discoloration, is prevented by a double-band hold-down system with simultaneous cooling. The fibers or chips remain in the board due to the smoothing pressure of the calendar rolls and the steel bands. The fibers/chips do not erect themselves, that is, the established dimensional rules for controlling moisture by the amount of the applied sprayed water, derived from the heat production of the oncoming board strand, the thickness and the wood species apply.

Also advantageous is the reduction of heat transfer resistance between the steel band and the board surface. Thus the double-band hold-down apparatus can be made shorter. The amount of sprayed water is governed by the board thickness: about 30 to 300 g/m$^2$ is needed per side. Not too much must be sprayed on, so as to avoid spotting on the surface On the other hand, thick boards require more cooling, so that more water must be sprayed on. Furthermore, the amount must be governed also according to the degree of moistening of the exterior faces of the boards. This is because the wetter the board needs to be, the more water must be sprayed onto it. The length of the spray section must be longer for longer continuously operating presses due to the greater feed speed. The length must be made long enough so that sufficient time remains before the second cooling section, i.e., entry into the double-band hold-down system. It should be long enough so that the water sprayed on can evaporate and thus the board faces can cool rapidly in the second cooling section to 100° C. From this, it is to be concluded that both the length of the spray run and the amount of water sprayed on are factors to be regulated. The governing factors are the temperature of the mat surface and the moisture of the board's outer layers. Therefore it is advantageous to make the length of the first cooling section variable by shifting the second cooling section. Due to the blocking bands engaging the edges of the board strand, and because water spray is not applied to the lateral edges, the swelling up of chips or fibers is prevented at the edges as well. As a result, an improved surface drying of the board strand can be achieved by a method of the invention, namely the first water-spray cooling with an evaporation zone and the second cooling run with the double-band hold-down system with intensive surface cooling.

Furthermore, it is advantageous that the hold-down bands exert a specific contact pressure of no more than 0.05 N/mm$^2$ on the surfaces of the board strand and that the abrupt chilling is performed until the temperature in the middle of the board strand has reached approximately 80° C. to 100° C.

In the double-band hold-down apparatus, a very low pressure, under 0.05 N/mm$^2$, assures that the bands lie full surface on the board strand and thus no resistance to heat transfer between band and board can occur. With the low pressure, it has the additional benefits that the board thickness is not reduced during cooling and the adhesive bonds thereby formed in the board are not destroyed again.

The spraying of water on the surface of the board strand can be performed from fine to coarse according to the property of the product produced. A fine mist spray is generally applied to an MDF board strand and a coarse mist spray to an OSB board strand. Furthermore, for health reasons in the later use of the boards, it is recommended adding, to the spray water in the first cooling section with the evaporation zone, substances which bind formaldehyde and/ or substances which are suitable for neutralizing the glue joints. Substances that bind formaldehyde include urea carbonate or ammonium carbonate solution, while substances which neutralize the glue joints include bases. The application of these additives to the board surfaces is performed advantageously shortly before they enter the double-band hold-down apparatus. This is because the boiling points of these substances are substantially lower than that of water. This assures that the substances applied will not be evaporated prematurely by the steel band hold-down and diffuse into the face layers.

It is also desirable to sand and/or varnish or coat the surfaces of the board strand immediately after the double-band hold-down apparatus.

SPECIFIC EXAMPLES

FIG. 1 shows an apparatus embodiment of the invention. Continuously running press 1 includes two flexible endless steel bands 3 and 4 which take the mat 2 between them and carry it through the continuously running press 1. The steel bands 3 and 4 are driven by drive drums 5 and end drums 6 around a press table 7 and a press ram 8. The mat is pressed with a friction-reducing means, such as roller rods 9 in some cases, against heated press plates 10 and 11 of press table 7 and press ram 8.

The first cooling section with evaporating zone $K_1$ comprises a water spray cooling system 21 with a plurality of water spray nozzles 22 which directly apply fine or coarse spray mists onto the lower and upper surface of the board strand 13. The water is better distributed and forced in by a plurality of calendar rolls 23 with light pressure. The length of the cooling section with evaporation zone $K_1$ is variable according to this embodiment of the invention within a variable distance $K_v$. This is in order to variably adapt the cooling effect to thin or thick boards. The water spray cooling system 21 is constructed within the length $K_v$ such that the calendar rolls 23 can be taken out or swung out in order to be able to shift the second cooling section $K_2$ in and out. The second cooling section $K_2$ includes the double-band hold-down system 12. The water spray nozzles 22 do not interfere, since they are installed high enough or low enough.

Figure 2:
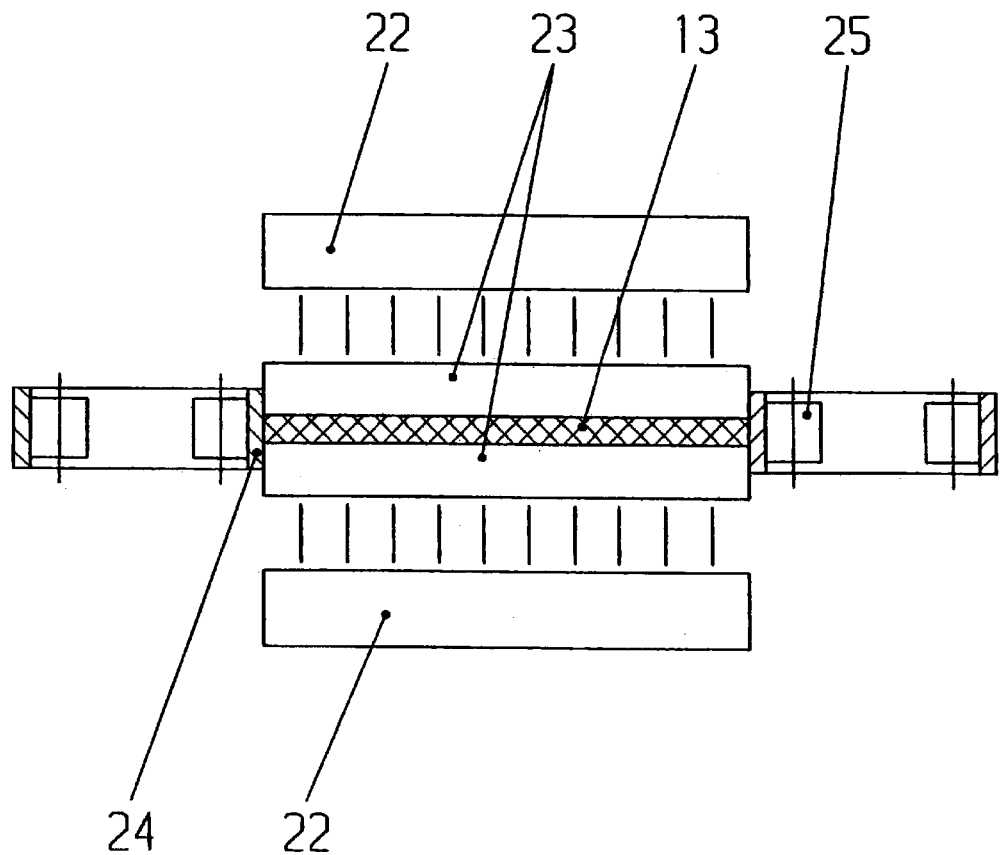
FIG. 2 Is a section through A—A of FIG. 1 illustrating the arrangement of the blocking bands on the edges of the board strand.

In FIG. 2, it is shown how, in section A—A, the endless blocking bands 24 are brought against the lateral edges of the board strand 13 by means of pressing-wheels 25 and pulley wheels. The second cooling system is in the form of a double-band hold-down system 12 and is disposed movably within a range $K_v$ directly behind the first water spray cooling system 21. The hold-down bands 17 and 18 take the board strand 13 between them and carry it. On the backs of the band faces there are a number of rows of coolant spray nozzles 16. The hold-down bands 17 and 18 revolve around drive rolls 14 and end rolls 15 and thrust downward within the cooling system or double-band hold-down apparatus 12 against transport rolls 19. The slight hold-down pressure on the hold-down bands 17 and 18 can be produced by pressurized air injected into the air pressure boxes 20.

This process with its apparatus can, of course, be operated also discontinuously, after appropriate modification.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

The priority document here, German patent application 199 49 662.5, is hereby incorporated by reference.

I claim:

1. A method for the production of boards of ligneous material comprising:

forming a press material mat treated with a binding agent on a continuously moving spreading band;

introducing the mat between the steel bands of a continuously operating hot press;

applying pressure and heat to said mat in the continuously operating hot press;

curing the mat into a hot board strand in the continuously operating hot press; then moistening both surfaces of the hot board strand;

shock cooling the hot board strand with sprayed water in a first cooling section with an evaporation zone variable in its length and adaptable to the thickness of the board strand wherein the board strand is held between endless blocking bands under multiple calendar rolls; and carrying the board strand to a directly adjoining second cooling section under a predetermined light pressure through a double-band hold-down apparatus wherein the backs of the hold-down bands are sprayed with a coolant.

2. The method of claim 1, wherein said ligneous material is selected from the group consisting of chips, fibers, and a combined portion of wood and plastic.

3. A method according to claim 1, wherein the hold-down bands exert a specific bearing pressure of no more than 0.05 N/mm² on the surfaces of the board strand and the time of action of the shock cooling performed in this manner is exerted until the temperature in the middle of the board strand has reached approximately 80° Celsius to 100° Celsius.

4. A method according to claim 1, wherein the surfaces of the board strand are sprayed with 30 to 300 g/m² of water per side.

5. A method according to claim 1, wherein the water spraying onto the surfaces of the board strand is sprayed according to the product produced.

6. A method according to claim 1, wherein substances are added to the spray water in the first cooling section with evaporation zone, which bind formaldehyde.

7. A method according to claim 6, wherein the substances are urea carbonate or ammonium carbonate solution.

8. A method according to claim 1, wherein substances are added to the spray water of the first cooling section with evaporation zone, which are suitable for neutralizing glue joints.

9. A method according to claim 8, wherein the addition of the substances is made before the entry of the board into the double-band hold-down apparatus.

10. A method according to claim 6, wherein the addition of the substances is made before the entry of the board into the double-band hold-down apparatus.

11. A method according to claim 1, wherein the surfaces of the board strand are ground and/or lacquered or coated immediately after the double-band hold-down apparatus.

12. An apparatus for the production of ligneous material boards comprising:
- a continuously operating hot press including two flexible endless steel bands;
- a press table;
- a press ram;
- a first water spray cooling apparatus of variously adjustable length with water spray nozzles adapted to directly spray water onto the surfaces of the boards and calendar rolls to put the board under light pressure; and
- a second cooling apparatus, wherein the second cooling apparatus is a double-band hold-down apparatus which can travel in a cooling range of the first water spray cooling apparatus and having a plurality of rows of coolant spray nozzles disposed on the backs of the band surfaces of the double-band hold-down apparatus which provide contact on the boards.

13. An apparatus of claim 12 further comprising friction-reducing elements.

14. An apparatus according to claim 12, further comprising a blocking band on both lateral edges of the board as edge protection within the first water spray cooling apparatus.

15. A method for the production of boards of ligneous material comprising:
- forming a press material mat treated with a binding agent;
- introducing the mat between the steel bands of a discontinuously operating hot press;
- applying pressure and heat to the mat in the discontinuously operating hot press;
- curing the mat into a hot board strand;
- moistening both surfaces of the hot board strand;
- shock cooling the hot board strand with sprayed water in a first cooling section with an evaporation zone variable in its length and adaptable to the thickness of the board strand wherein the board strand is held between endless blocking bands under multiple calendar rolls; and
- carrying the board bands to a directly adjoining second cooling section under a predetermined light pressure through a double-band hold-down apparatus wherein the backs of the hold-down bands are sprayed with a coolant.

16. A method for the production of boards comprising:
- forming a press material mat treated with a binding agent on a continuously moving spreading band;
- introducing the mat between steel bands of a continuously operating hot press;
- applying pressure and heat to said mat in the continuously operating hot press;
- curing the mat into a hot board strand in the continuously operating hot press; then
- moistening both surfaces of the hot board strand;
- shock cooling the hot board strand with sprayed water in a first cooling section with an evaporation zone variable in its length and adaptable to the thickness of the board strand wherein the board strand is held between endless blocking bands under multiple calendar rolls; and
- carrying the board strand to a directly adjoining second cooling section under a predetermined light pressure through a double-band hold-down apparatus wherein the backs of the hold-down bands are sprayed with a coolant;
- wherein the boards are selected from the group consisting of plastic boards and plastic boards from a combined portion of wood and plastic, and from plastic with and without reinforcing inserts.

* * * * *